United States Patent
Wang et al.

(10) Patent No.: US 12,462,384 B2
(45) Date of Patent: Nov. 4, 2025

(54) METHOD AND APPARATUS FOR ENHANCING LUMEN DISPLAY IN CT SECTIONAL IMAGE OF BLOOD VESSEL, AND CT SYSTEM

(71) Applicant: Siemens Healthineers AG, Forchheim (DE)

(72) Inventors: Xu Wang, Shanghai (CN); Yi Tian, Shanghai (CN); Zhen Yu Fei, Shanghai (CN); Wei Zhou, Shanghai (CN)

(73) Assignee: Siemens Healthineers AG, Forchheim (DE)

( * ) Notice: Subject to any disclaimer, the term of this patent is extended or adjusted under 35 U.S.C. 154(b) by 290 days.

(21) Appl. No.: 18/222,615

(22) Filed: Jul. 17, 2023

(65) Prior Publication Data
US 2024/0029244 A1 Jan. 25, 2024

(30) Foreign Application Priority Data
Jul. 18, 2022 (CN) .......................... 202210841816.1

(51) Int. Cl.
*G06T 7/00* (2017.01)
*A61B 5/00* (2006.01)

(52) U.S. Cl.
CPC .......... *G06T 7/0012* (2013.01); *A61B 5/0033* (2013.01); *A61B 5/0073* (2013.01);
(Continued)

(58) Field of Classification Search
None
See application file for complete search history.

(56) References Cited

U.S. PATENT DOCUMENTS 11,963,724 B1 * 4/2024 Roh ....................... G06T 7/0012
12,144,669 B2 * 11/2024 Min ....................... G06V 10/26
(Continued)

FOREIGN PATENT DOCUMENTS

CN 114098769 A 3/2022

OTHER PUBLICATIONS

Heo Ran et al: "Optimal Boundary Detection Method and Window Settings for Coronary Atherosclerotic Plaque Volume Analysis in Coronary Computed Tomography Angiography: Comparison With Intravascular Ultrasound", Eur. Radiol., vol. 26, No. 9, Dec. 2, 2015, pp. 3190-3198.
(Continued)

*Primary Examiner* — Nancy Bitar
(74) *Attorney, Agent, or Firm* — Banner & Witcoff Ltd.

(57) ABSTRACT

The present disclosure is directed to enhancing a lumen display in a CT sectional image of a blood vessel. The CT sectional image may be displayed with a first window level. An average CT value of lumen sections near the heart may be obtained, and a highest CT value of a section of a current blood vessel may also be obtained. A window level may be determined based on the average CT value and the highest CT value. At least a part of the section of the current blood vessel may then be displayed with the window level. The techniques allow for a window level to be preset to enhance lumen display and to improve the consistency of delineating the lumen contour, thereby avoiding deviations caused by subjective selection while saving time and improving patient flow.

18 Claims, 6 Drawing Sheets

(52) U.S. Cl.
CPC ............... *G06T 2207/10081* (2013.01); *G06T 2207/20021* (2013.01); *G06T 2207/30101* (2013.01)

(56) References Cited

U.S. PATENT DOCUMENTS

| | | | |
|---|---|---|---|
| 2008/0101667 A1* | 5/2008 | Begelman | G06T 7/11 600/407 |
| 2010/0104160 A1* | 4/2010 | Lavi | G06T 19/00 382/131 |
| 2013/0343622 A1 | 12/2013 | Ruiz et al. | |

OTHER PUBLICATIONS

Eigen Katharina et al: "Geometric Modeling of The Aortic Inner and Outer Vessel Wall From CTA for Aortic Dissection Analysis", Medical Imaging pp. 10561X-105761X; vol. 10576; Mar. 13, 2018; DOI:10.1117/12.2293069; XP060106805; ISSN: 1605-7422.

* cited by examiner

METHOD AND APPARATUS FOR ENHANCING LUMEN DISPLAY IN CT SECTIONAL IMAGE OF BLOOD VESSEL, AND CT SYSTEM

CROSS-REFERENCE TO RELATED APPLICATIONS

The present application claims priority to and the benefit of China patent application no. CN 202210841816.1, filed on Jul. 18, 2022, the contents of which are incorporated herein by reference in their entirety.

TECHNICAL FIELD

The present disclosure relates to computerized tomography (CT) imaging and, in particular, to the identification of a lumen of a blood vessel.

BACKGROUND

A lumen of a blood vessel is the inside space of a tubular structure in which blood flows freely. Proper lumen delineation is critical for radiological or clinical applications and diagnosis based on CT images, which are the input for quantitative analysis or automated analysis enabled by AI models and algorithms (such as ct-FFR).

On the other hand, contrast-enhanced scans (e.g. using iodine) are often used for CT angiography due to a low contrast between the lumen and peripheral tissue such that the HU value of the lumen is enhanced by imaging a mixture of iodine and blood. However, in general, manual operations such as contouring from given sectional images or adjusting on axial images and MPR/CPR views remain the primary means of providing lumen contour information.

Ensuring contour accuracy is challenging because CTA (CT angiography) images are usually displayed with a preset window width and window level, which may not be optimized for each specific vessel branch due to different shapes and blood volumes. Moreover, it is difficult to determine the lumen contour when some vascular lesions (such as calcified plaques) are present near or inside the lumen. Special window settings are required to distinguish between lumen (contrast-enhanced blood volume), soft tissue, and plaques.

SUMMARY

Therefore, deviations in the lumen contour (wider than it actually is, or including plaques that are not part of the lumen) will affect quantitative diagnostic quality. This also passes the deviations to automated or quantitative analysis (e.g., cI-FR calculations). To illustrate this, FIG. 1 is a schematic diagram of a CT sectional image of a conventional blood vessel, with a window width and a window level optimized to distinguish between the lumen and soft tissue. A region enclosed with the pink line in the figure is the lumen, around which is soft tissue. The lumen in the figure contains plaques, but the boundary between the two is not clear. With the current window width and window level, an operator cannot distinguish between the plaques and the lumen. Thus, to distinguish between the plaques and the lumen, different readers adjust the window width and window level when reading the same image. Due to the difference in the window width and level, contours of blood vessels delineated may be inconsistent.

In current practice, to solve the above problems, a reader is required to manually adjust display settings to obtain a better visual contrast for specific regions or sections. However, there are the following limitations:

1. It is very time-consuming to manually adjust window settings for specific regions or blood vessels.
2. Full manual operation reduces reproducibility and also introduces different subjective determination deviations between readers with respect to an optimal contrast for the readers. Both of these points may affect the standardization of diagnostic or analytical quality.
3. The operation is more complex when it is necessary to distinguish between soft tissue, lumen, and plaques. Considering the two points mentioned above, it is not feasible to frequently switch the window width and window level in the same region or section.

Chinese application No. 202010893793.X discloses a medical image display method and module, and a medical imaging device, in which a medical image is displayed in a selected region with different window widths and window levels to improve a contrast of the region.

In view of this, the present disclosure provides a method and apparatus for enhancing lumen display in a CT sectional image of a blood vessel, a computer-readable storage medium, and a CT system.

According to a first embodiment of the present disclosure, a method for enhancing lumen display in a CT sectional image of a blood vessel is provided, the CT sectional image being displayed with a first window level, the method comprising:

obtaining an average CT value $CT_{nearHeart}$ of lumen sections near the heart;

obtaining a highest CT value $CT_{highest}$ of a section of a current blood vessel;

determining a window level WC based on the average CT value $CT_{nearHeart}$ and the highest CT value $CT_{highest}$; and displaying at least a part of the section of the current blood vessel with the window level WC.

In an embodiment, the determining a window level WC based on the average CT value $CT_{nearHeart}$ and the highest CT value $CT_{highest}$ comprises determining the window level WC according to the following Equation:

$$WC = \begin{cases} T, & \frac{1}{2}|CT_{highest} - CT_{nearHeart}| < T \\ \frac{1}{2}|CT_{highest} - CT_{nearHeart}|, & \text{otherwise} \end{cases}$$

where T represents an integer and 50<T<200.

In an embodiment, the displaying at least a part of the section of the current blood vessel with the window level WC comprises superimposing a second window on a window displaying the section of the current blood vessel with the first window level, and displaying on the second window the section of the current blood vessel with the window level WC, where the same pixels of the section of the current blood vessel on the two windows overlap.

In various embodiments, the second window is movable and/or scalable.

In an embodiment, the method further comprises displaying a curved planar reformation image of the blood vessel, where the blood vessel in the curved planar reformation image has a marker that marks a position of the section of the current blood vessel.

In an embodiment, the marker is draggable along the blood vessel, and the perimeter of the marker in the curved planar reformation image and the second window have the same window width and window level.

In an embodiment, a window width and window level of the second window for displaying the section of the current blood vessel are adjustable.

In an embodiment, the first window level distinguishes between lumen and soft tissue.

According to a second embodiment of the present disclosure, a computer-readable storage medium is provided, where the computer-readable storage medium stores a computer program that, when executed by a processor, controls a device on which the storage medium resides to perform any of the methods described above.

According to a third embodiment of the present disclosure, an apparatus for enhancing lumen display in a CT sectional image of a blood vessel is provided, the CT sectional image being displayed with a first window level, the apparatus comprising:

an average CT value obtaining unit that obtains an average CT value $CT_{nearHeart}$ of lumen sections near the heart;

a highest CT value obtaining unit that obtains a highest CT value $CT_{highest}$ of a section of a current blood vessel;

a window level determination unit that determines a window level WC based on the average CT value $CT_{nearHeart}$ and the highest CT value $CT_{highest}$; and a display unit that displays at least a part of the section of the current blood vessel with the window level WC.

In an embodiment, the window level determination unit determines the window level WC according to the following equation:

$$WC = \begin{cases} T, \frac{1}{2}|CT_{highest} - CT_{nearHeart}| < T \\ \frac{1}{2}|CT_{highest} - CT_{nearHeart}|, \text{otherwise} \end{cases}$$

where T is an integer and 50<T<200.

In an embodiment, the display unit superimposes a second window on a window by displaying the section of the current blood vessel with the first window level, and displays on the second window the section of the current blood vessel with the window level WC, where the same pixels of the section of the current blood vessel on the two windows overlap.

In various embodiments, the second window is movable and/or scalable.

In an embodiment, the apparatus further comprises a curved planar reformation image display unit that displays a curved planar reformation image of the blood vessel, where the blood vessel in the curved planar reformation image has a marker that marks a position of the section of the current blood vessel.

In an embodiment, the marker is draggable along the blood vessel, and the perimeter of the marker in the curved planar reformation image and the second window have the same window width and window level.

In an embodiment, a window width and window level of the second window for displaying the section of the current blood vessel are adjustable.

In an embodiment, the first window level distinguishes between lumen and soft tissue.

According to a fourth embodiment of the present disclosure, a CT system is provided, the CT system comprising the apparatus described above.

The method, the computer-readable storage medium, the apparatus, and the CT system of the present disclosure allow for a window level to be preset to enhance lumen display and improve the consistency of delineating the lumen contour, thereby avoiding deviations caused by subjective selection while saving time and improving patient flow. If the section of the blood vessel is displayed on the second window, the lumen, intraluminal abnormality, and soft tissue can be distinguished at the same time, avoiding frequent switching between two sets of window widths and window levels. This view can also be displayed in conjunction with the curved planar reformation image.

BRIEF DESCRIPTION OF THE DRAWINGS

Further features and advantages of the disclosure are explained in the following with reference to the figures, in which.

The embodiments of the present disclosure will be described in detail hereinafter with reference to the accompanying drawings to make the above mentioned and other features and advantages of the present disclosure more apparent to those of ordinary skill in the art, in which.

DETAILED DESCRIPTION OF THE DISCLOSURE

In order to make the objectives, technical solutions, and advantages of the present disclosure more apparent, the present disclosure will be described in further detail below by way of various embodiments.

Figure 1:
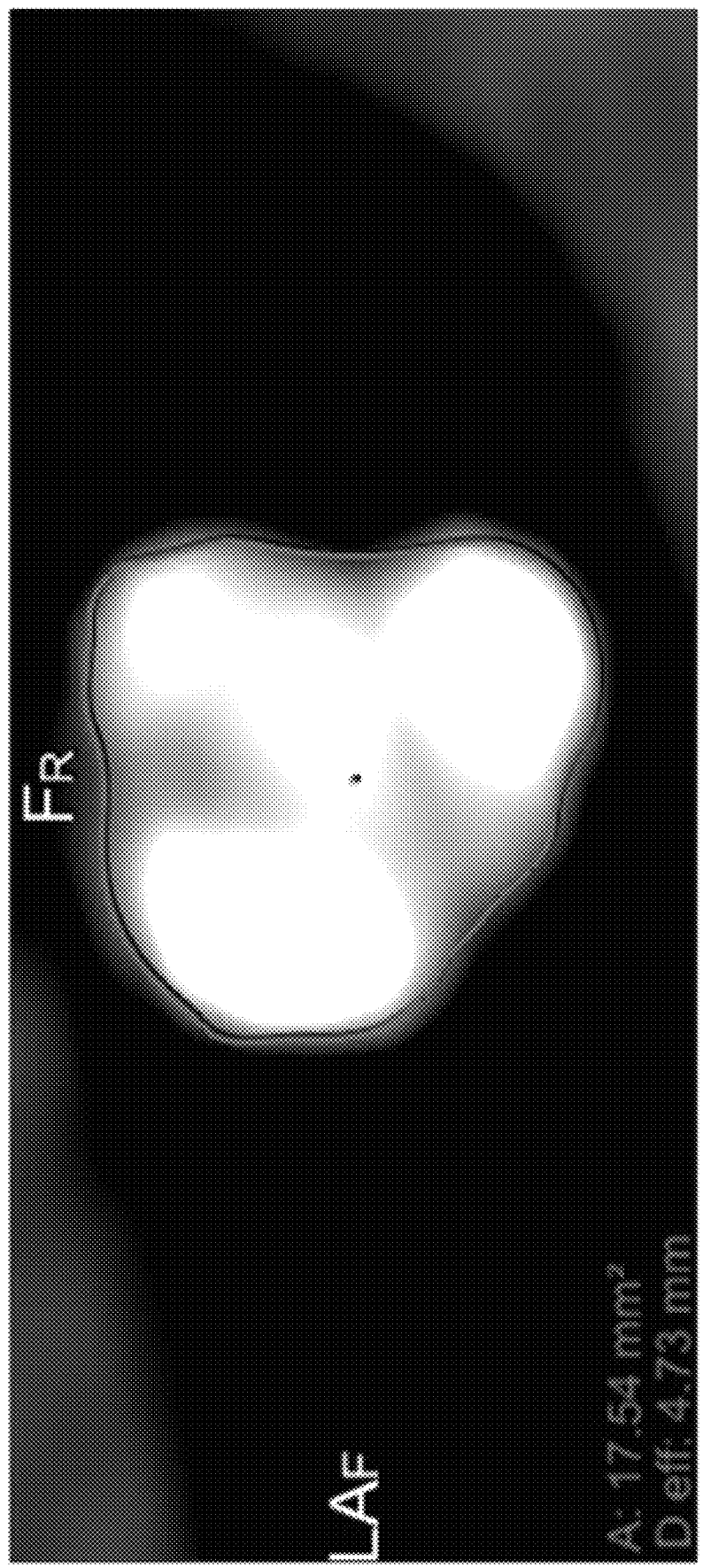
FIG. 1 is a schematic diagram of a conventional CT sectional image of a blood vessel.
Figure 2:
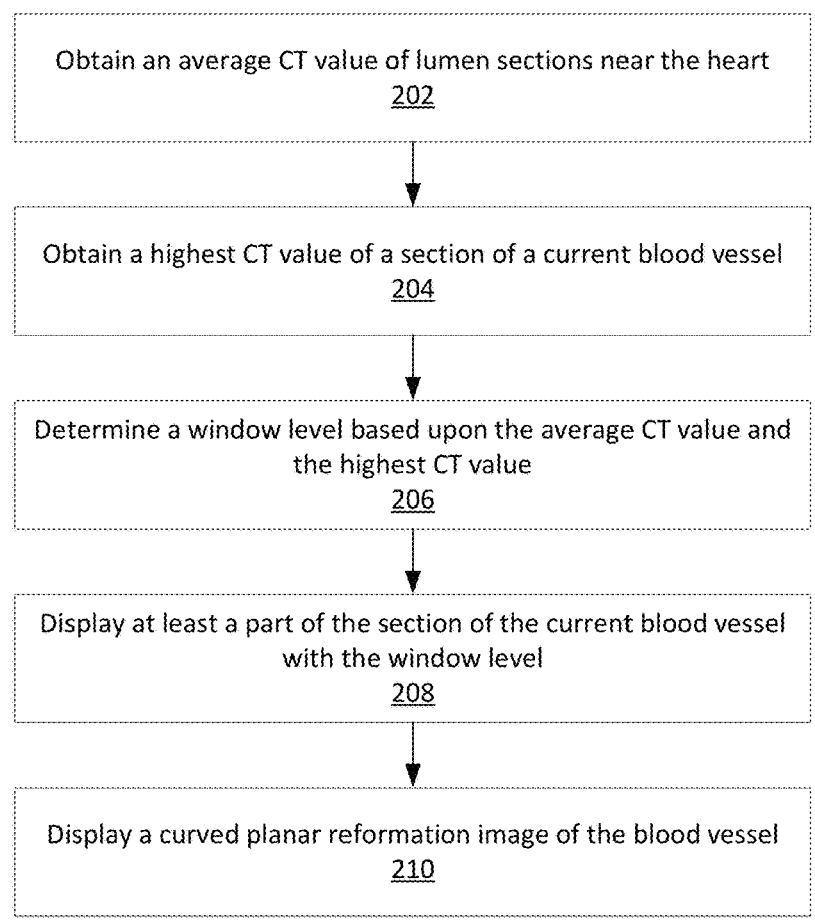
FIG. 2 is a schematic flowchart of an example method for enhancing lumen display in a CT sectional image of a blood vessel according to a first embodiment of the present disclosure.

FIG. 2 is a schematic flowchart of an example method 200 for enhancing lumen display in a CT sectional image of a blood vessel according to a first embodiment of the present disclosure. The CT sectional image is displayed with a first window level, and the method 200 for enhancing lumen display in a CT sectional image of a blood vessel includes steps 202, 204, 206, and 208.

In step 202, an average CT value $CT_{nearHeart}$ of lumen sections near (e.g. proximate to) the heart is obtained. In this context, "near" or "proximate to" the heart may mean within the heart tissue or in a region or proximity thereof that may be relevant for diagnostic imaging and testing. The region may, for instance, comprise a patient's entire chest cavity, a region within a distance of a center of the heart that is equal to the width of the heart, a proportion thereof such as 1.5× the width, 2× the width, etc.

In step 204, a highest CT value $CT_{highest}$ of a section of a current blood vessel is obtained. This is because plaques have the highest CT value in this region.

In step 206, a window level WC is determined based on the average CT value $CT_{nearHeart}$ and the highest CT value $CT_{highest}$. In this embodiment, the window level WC is determined according to the following formula:

$$WC = \begin{cases} T, & \frac{1}{2}|CT_{highest} - CT_{nearHeart}| < T \\ \frac{1}{2}|CT_{highest} - CT_{nearHeart}|, & \text{otherwise} \end{cases}$$

where T is an integer and 50<T<200. The value of T may be any suitable value, although it may be particularly advantageous for T=100. The window width may be set to be narrower for a better contrast. A typical value of the window width is 100.

In step 208, at least a part of the section of the current blood vessel is displayed with the window level WC.

Figure 3:
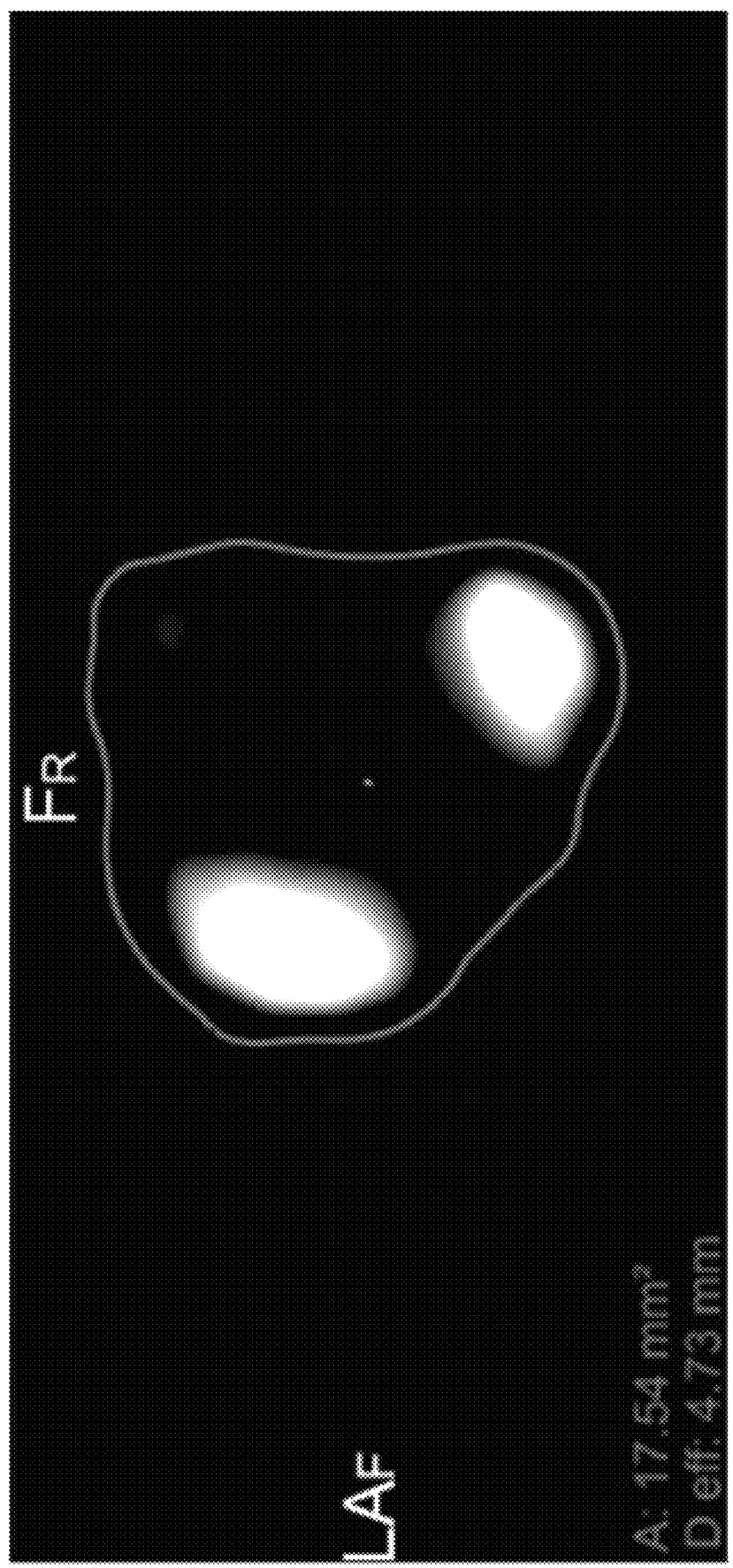
FIG. 3 is a schematic diagram of an example CT sectional image of a blood vessel according to the first embodiment and a second embodiment of the present disclosure.

FIG. 3 is a schematic diagram of an example CT sectional image of a blood vessel according to the first embodiment and a second embodiment of the present disclosure. FIG. 3 shows the entire section of the current blood vessel with the window level WC. On the section of the current blood vessel, the plaques and the lumen are distinguished. In a region enclosed with the pink line, the highlighted part represents the plaques. In this case, the lumen contour can be delineated in the image, improving the consistency of delineating the contour by a doctor.

However, the lumen cannot be distinguished from the soft tissue in FIG. 3. To distinguish the lumen from the soft tissue, the lumen needs to be displayed with the first window level.

In order to solve the problem of frequent switching between two sets of window widths and window levels, in step 208, a second window may be superimposed on a window displaying the section of the current blood vessel with the first window level, and the section of the current blood vessel may be displayed on the second window with the window level WC, where the same pixels of the section of the current blood vessel on the two windows overlap.

Figure 4:
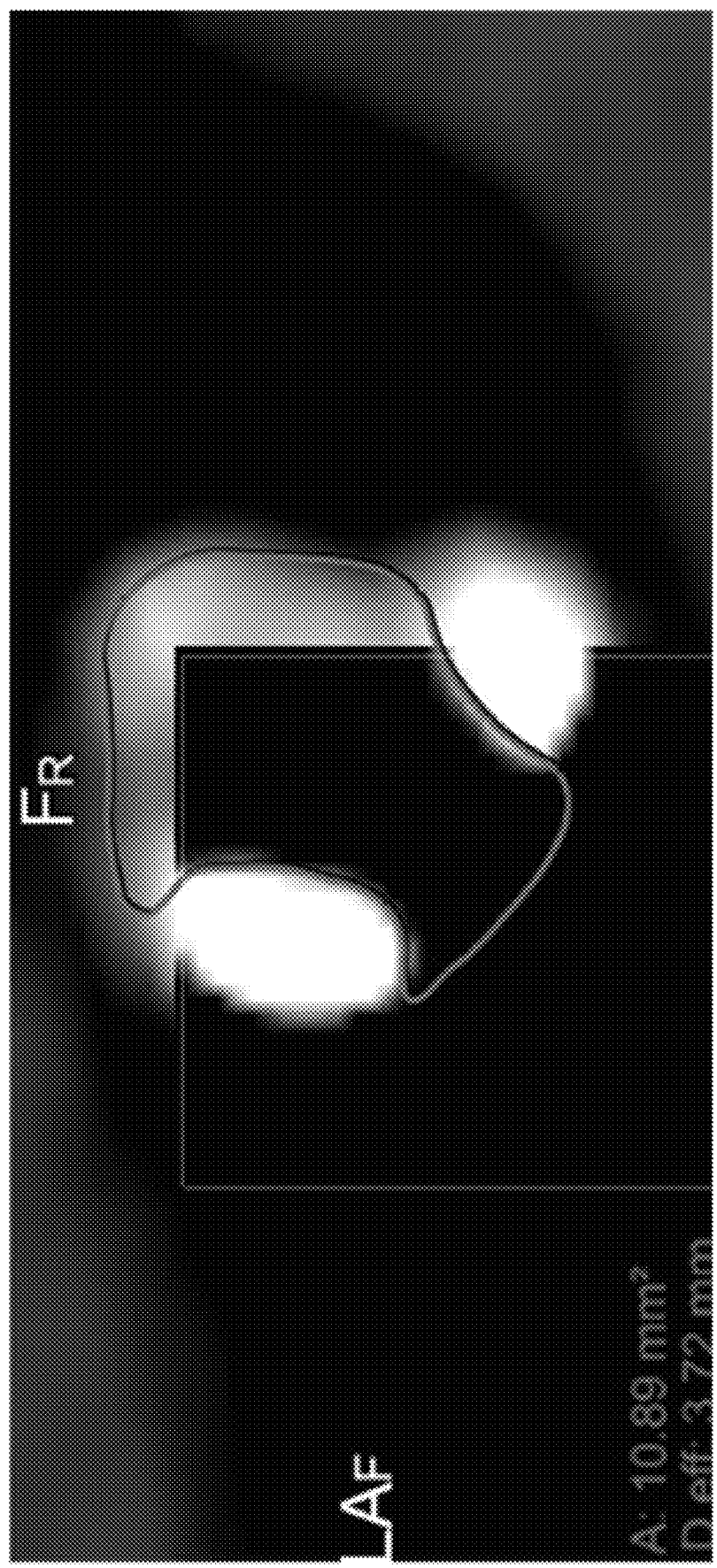
FIG. 4 is a schematic diagram of an example CT sectional image of a blood vessel according to the first embodiment and the second embodiment of the present disclosure.

FIG. 4 is a schematic diagram of an example CT sectional image of a blood vessel according to the first embodiment and the second embodiment of the present disclosure. As shown in FIG. 4, a square region is the second window, in which the lumen and the plaques are distinguished by the window level WC. Outside the second window, the lumen and the soft tissue are distinguished by the first window level. Therefore, an operator can distinguish between lumen, soft tissue, and plaques at the same time.

In various embodiments, the second window may be movable and/or scalable. Furthermore, a window width and window level of the second window for displaying the section of the current blood vessel may be adjustable.

In addition to displaying at least a part of the section of the current blood vessel (on the second window) with the window level WC, in this embodiment the method 200 further comprises step 210. In step 210, a curved planar reformation image of the blood vessel is displayed, where the blood vessel in the curved planar reformation image has a marker that marks a position of the section of the current blood vessel.

Figure 5:
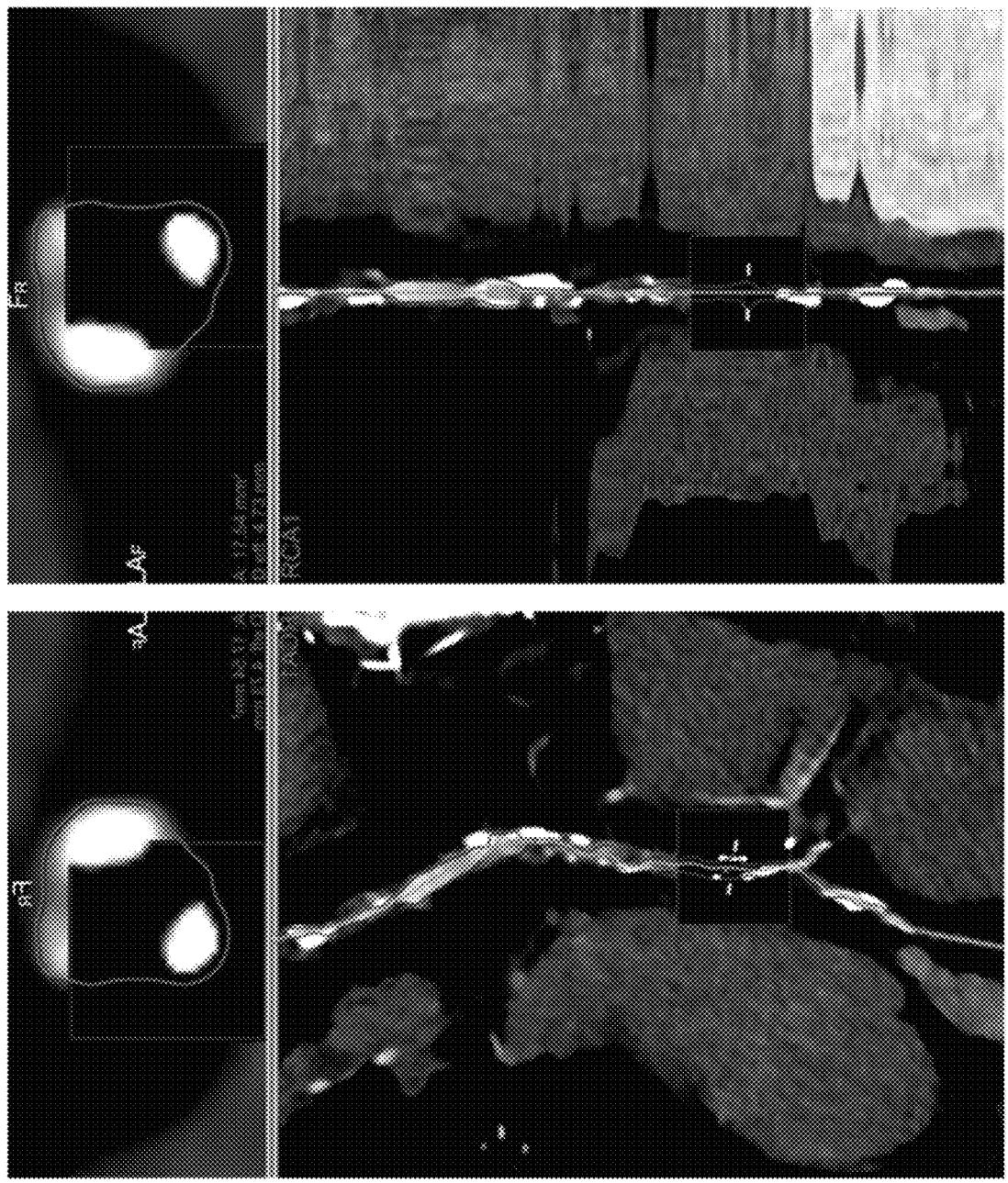
FIG. 5 is a schematic diagram of an example CT sectional image and a curved planar reformation image of a blood vessel according to the first embodiment and the second embodiment of the present disclosure.

FIG. 5 is a schematic diagram of an example CT sectional image and a curved planar reformation image of a blood vessel according to the first embodiment and the second embodiment of the present disclosure. The lower two figures in FIG. 5 are curved planar reformation images. As shown in FIG. 5, a blood vessel in the curved planar reformation image has a yellow line marking a position of a section of the current blood vessel. In this embodiment, the marker is draggable along the blood vessel, and the section of the blood vessel on the second window is also updated synchronously. The perimeter of the marker in the curved planar reformation image has the same window width and window level as the second window, and the perimeter may be, for example, a square region centered on the yellow line.

The present disclosure further provides a computer-readable storage medium. The computer-readable storage medium stores a computer program that, when executed by a processor, controls a device on which the storage medium resides to perform any of the steps (including all steps) of the method 200.

Figure 6:
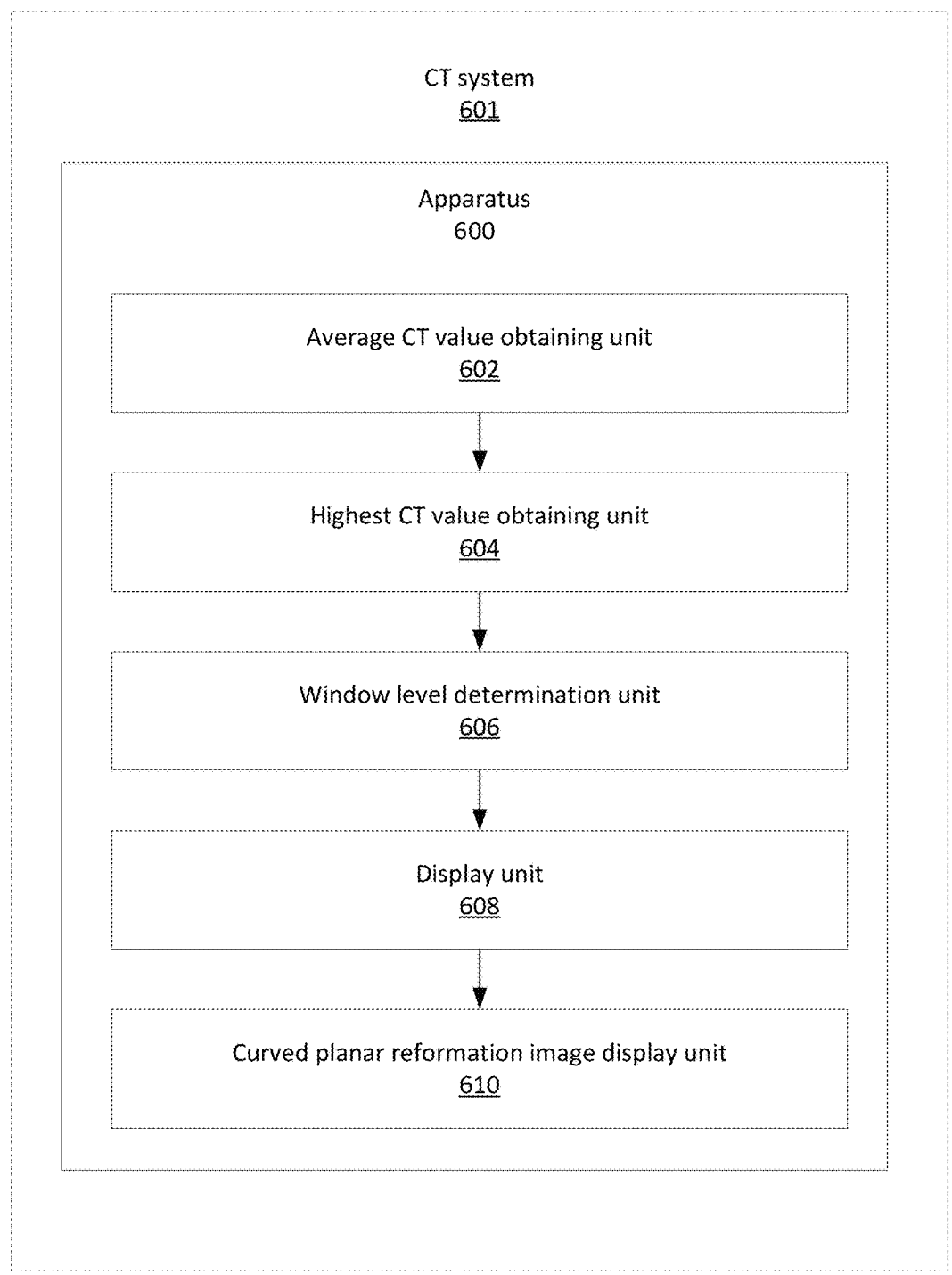
FIG. 6 is a schematic block diagram of a structure of an example apparatus for enhancing lumen display in a CT sectional image of a blood vessel according to the second embodiment of the present disclosure.

FIG. 6 is a schematic block diagram of a structure of an example apparatus 600 for enhancing lumen display in a CT sectional image of a blood vessel according to the second embodiment of the present disclosure. The CT sectional image is displayed with a first window level, and the apparatus 600 for enhancing lumen display in a CT sectional image of a blood vessel includes an average CT value obtaining unit 602, a highest CT value obtaining unit 604, a window level determination unit 606, and a display unit 608.

The average CT value obtaining unit 602 is configured to obtain an average CT value $CT_{nearHeart}$ of lumen sections near the heart.

The highest CT value obtaining unit 604 is configured to obtain a highest CT value $CT_{highest}$ of a section of a current blood vessel. This is because plaques have the highest CT value in this region.

The window level determination unit 606 is configured to determine a window level WC based on the average CT value $CT_{nearHeart}$ and the highest CT value $CT_{highest}$. In this embodiment, the window level WC is determined according to the following equation:

$$WC = \begin{cases} T, & \frac{1}{2}|CT_{highest} - CT_{nearHeart}| < T \\ \frac{1}{2}|CT_{highest} - CT_{nearHeart}|, & \text{otherwise} \end{cases}$$

where T represents an integer and 50<T<200. Again, T may be any suitable value, although it may be particularly advantageous for T=100. The window width may be set to be narrower for a better contrast. A typical value of the window width is 100.

The display unit 608 is configured to display at least a part of the section of the current blood vessel with the window level WC.

FIG. 3 is a schematic diagram of an example CT sectional image of a blood vessel according to the first embodiment and a second embodiment of the present disclosure. FIG. 3 shows the entire section of the current blood vessel with the window level WC. On the section of the current blood vessel, the plaques and the lumen are distinguished. In a region enclosed with the pink line, the highlighted part is the plaques. In this case, the lumen contour can be delineated in the image, improving the consistency of delineating the contour by a doctor.

However, the lumen cannot be distinguished from the soft tissue in FIG. 3. Again, to distinguish the lumen from the soft tissue, it needs to be displayed with the first window level.

In order to solve the problem of frequent switching between two sets of window widths and window levels, in this embodiment, the display unit 608 superimposes a second window on a window displaying the section of the current blood vessel with the first window level, and displays on the second window the section of the current blood vessel with the window level WC, where the same pixels of the section of the current blood vessel on the two windows overlap.

FIG. 4 is a schematic diagram of an example CT sectional image of a blood vessel according to the first embodiment and the second embodiment of the present disclosure. As shown in FIG. 4, a square region is the second window, in which the lumen and the plaques are distinguished by the window level WC. Outside the second window, the lumen and the soft tissue are distinguished by the first window level. Therefore, an operator can distinguish between lumen, soft tissue, and plaques at the same time.

In various embodiments, the second window is movable and/or scalable. Moreover, a window width and window level of the second window for displaying the section of the current blood vessel may be adjustable.

In addition to displaying at least a part of the section of the current blood vessel (on the second window) with the window level WC, in this embodiment, the apparatus 600 further includes a curved planar reformation image display unit 610 that displays a curved planar reformation image of the blood vessel, where the blood vessel in the curved planar reformation image has a marker that marks a position of the section of the current blood vessel.

FIG. 5 is a schematic diagram of an example CT sectional image and a curved planar reformation image of a blood vessel according to the first embodiment and the second embodiment of the present disclosure. The lower two figures in FIG. 5 are curved planar reformation images. As shown in FIG. 5, a blood vessel in the curved planar reformation image has a yellow line marking a position of a section of the current blood vessel. In this embodiment, the marker is draggable along the blood vessel, and the section of the blood vessel on the second window is also updated synchronously. The perimeter of the marker in the curved planar reformation image has the same window width and window level as the second window, and the perimeter may be, for example, a square region centered on the yellow line.

The present disclosure further provides a CT system 601, including the apparatus 600.

The method, the computer-readable storage medium, the apparatus, and the CT system of the present disclosure allow for a window level to be preset to enhance lumen display and improve the consistency of delineating the lumen contour, thereby avoiding deviations caused by subjective selection, while saving time and improving patient flow. If the section of the blood vessel is displayed on the second window, the lumen, intraluminal abnormality, and soft tissue can be distinguished at the same time, avoiding frequent switching between two sets of window widths and window levels. This view can also be displayed in conjunction with the curved planar reformation image.

The above descriptions are described with respect to the preferred embodiments of the present disclosure, but are not intended to limit the present disclosure. Any modifications, equivalent substitutions, improvements, etc. made within the spirit and principle of the present disclosure should be included within the scope of protection of the present disclosure.

The various components described herein may be referred to as "units" or "apparatuses." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units or devices, as applicable and relevant, may alternatively be referred to herein as "circuitry," "controllers," "processors," or "processing circuitry," or alternatively as noted herein.

What is claimed is:

1. A method for enhancing lumen displayed in a computerized tomography (CT) sectional image of a blood vessel, the method comprising:
   obtaining an average CT value $CT_{nearHeart}$ of lumen sections proximate to a heart;
   obtaining a highest CT value $CT_{highest}$ of a section of a blood vessel;
   determining a window level based on the average CT value $CT_{nearHeart}$ and the highest CT value $CT_{highest}$; and
   displaying at least a portion of the section of the blood vessel in accordance with the determined window level by:
      superimposing a further window on the window in which the at least the portion of the section of the blood vessel is displayed in accordance with the determined window level; and
      displaying, in the further window, the at least the portion of the section of the blood vessel in accordance with the determined window level,
   wherein the same pixels of the at least the portion of the section of the blood vessel on the window and the further window overlap with one another.

2. The method according to claim 1, wherein determining the window level comprises determining the window level (WC) by evaluating:

$$WC = \begin{cases} T, & \frac{1}{2}|CT_{highest} - CT_{nearHeart}| < T \\ \frac{1}{2}|CT_{highest} - CT_{nearHeart}|, & \text{otherwise} \end{cases}$$

wherein T represents an integer, and
wherein 50<T<200.

3. The method according to claim 1, wherein the further window is movable.

4. The method according to claim 1, wherein the further window is scalable.

5. The method according to claim 1, further comprising:
   displaying a curved planar reformation image of the blood vessel,
   wherein the blood vessel in the curved planar reformation image comprises a marker that identifies a position of the at least the portion of the section of the blood vessel.

6. The method according to claim 5, wherein the marker is draggable along the blood vessel, and
   wherein a perimeter of the marker in the curved planar reformation image and the further window have the same window width and window level.

7. The method according to claim 1, wherein a window width and window level of the further window are adjustable.

8. The method according to claim 1, wherein the window level enables a distinction between lumen and soft tissue.

9. A computer-readable storage medium of a device, the computer-readable storage medium storing a computer program that, when executed by a processor, causes the device to enhance lumen displayed in a computerized tomography (CT) sectional image of a blood vessel by:
obtaining an average CT value $CT_{nearHeart}$ of lumen sections proximate to a heart;
obtaining a highest CT value $CT_{highest}$ of a section of a blood vessel;
determining a window level based on the average CT value $CT_{nearHeart}$ and the highest CT value $CT_{highest}$; and
displaying at least a portion of the section of the blood vessel in accordance with the determined window level by:
superimposing a further window on the window in which the at least the portion of the section of the blood vessel is displayed in accordance with the determined window level; and
displaying, in the further window, the at least the portion of the section of the blood vessel in accordance with the determined window level,
wherein the same pixels of the at least the portion of the section of the blood vessel on the window and the further window overlap with one another.

10. The computer-readable storage medium of claim 9, wherein the computer program, when executed by the processor, causes the device to determine the window level (WC) by evaluating:

$$WC = \begin{cases} T, \frac{1}{2}|CT_{highest} - CT_{nearHeart}| < T \\ \frac{1}{2}|CT_{highest} - CT_{nearHeart}|, \text{otherwise} \end{cases}$$

wherein T represents an integer, and
wherein 50<T<200.

11. An apparatus for enhancing lumen displayed in a computerized tomography (CT) sectional image of a blood vessel, the apparatus comprising:
average CT value obtaining circuitry configured to obtain an average CT value $CT_{nearHeart}$ of lumen sections proximate to a heart;
highest CT value obtaining circuitry configured to obtain a highest CT value $CT_{highest}$ of a section of a blood vessel;
window level determination circuitry configured to determine a window level based on the average CT value $CT_{nearHeart}$ and the highest CT value $CT_{highest}$; and
a display configured to present at least a portion of the section of the blood vessel in accordance with the determined window level by:
superimposing a further window on the window in which the at least the portion of the section of the blood vessel is displayed in accordance with the determined window level; and
displaying, in the further window, the at least the portion of the section of the blood vessel in accordance with the determined window level,
wherein the same pixels of the at least the portion of the section of the blood vessel on the window and the further window overlap with one another.

12. The apparatus according to claim 11, wherein the window level determination circuitry is configured to determine the window level (WC) by evaluating:

$$WC = \begin{cases} T, \frac{1}{2}|CT_{highest} - CT_{nearHeart}| < T \\ \frac{1}{2}|CT_{highest} - CT_{nearHeart}|, \text{otherwise} \end{cases}$$

wherein T represents an integer, and
wherein 50<T<200.

13. The apparatus according to claim 11, wherein the further window is movable.

14. The apparatus according to claim 11, wherein the further window is scalable.

15. The apparatus according to claim 11, further comprising:
curved planar reformation image display circuitry configured to present a curved planar reformation image of the blood vessel,
wherein the blood vessel in the curved planar reformation image comprises a marker that marks a position of the at least the portion of the section of the blood vessel.

16. The apparatus according to claim 15, wherein the marker is draggable along the blood vessel, and
wherein a perimeter of the marker in the curved planar reformation image and the further window have the same window width and window level.

17. The apparatus according to claim 15, wherein a window width and window level of the further window are adjustable.

18. The apparatus according to claim 11, wherein the window level enables a distinction between lumen and soft tissue.

* * * * *